(12) United States Patent
Honeck

(10) Patent No.: US 12,443,161 B2
(45) Date of Patent: Oct. 14, 2025

(54) COMPUTER NUMERICAL CONTROL (CNC) MACHINE AND METHOD FOR USING

(71) Applicant: G90 ENGINEERING, LLC, Cincinnati, OH (US)

(72) Inventor: Joseph Honeck, Cincinnati, OH (US)

( * ) Notice: Subject to any disclaimer, the term of this patent is extended or adjusted under 35 U.S.C. 154(b) by 414 days.

(21) Appl. No.: 18/059,788

(22) Filed: Nov. 29, 2022

(65) Prior Publication Data

US 2023/0176543 A1 Jun. 8, 2023

Related U.S. Application Data

(60) Provisional application No. 63/285,156, filed on Dec. 2, 2021.

(51) Int. Cl.
*G05B 19/40* (2006.01)
*G05B 19/409* (2006.01)

(52) U.S. Cl.
CPC .................... *G05B 19/409* (2013.01)

(58) Field of Classification Search
None
See application file for complete search history.

(56) References Cited

U.S. PATENT DOCUMENTS

2004/0222300 A1\* 11/2004 Strickland .......... G05B 19/0421
235/462.15
2017/0255183 A1\* 9/2017 Clement ................ B25J 9/1697
2018/0150055 A1\* 5/2018 Shapiro .............. G05B 19/4063

\* cited by examiner

*Primary Examiner* — Hien D Khuu
(74) *Attorney, Agent, or Firm* — Taft Stettinius & Hollister LLP

(57) ABSTRACT

A computer numerical control apparatus including an operably connected first user interface configured to send operating instructions to the computer numerical control apparatus, and a second operably connected user interface comprising a barcode scanner configured to send operating instructions to the computer numerical control apparatus. A control board is functionally connected to the computer numerical control apparatus, the first user interface, and the second user interface. A selection component accepts operating instructions from at least one of the first user interface and the second user interface.

13 Claims, 13 Drawing Sheets

COMPUTER NUMERICAL CONTROL (CNC) MACHINE AND METHOD FOR USING

This application claims the benefit of U.S. Provisional Application No. 63/285,156, entitled COMPUTER NUMERICAL CONTROL (CNC) MACHINE AND METHOD FOR USING, filed Dec. 2, 2021, which is fully incorporated herein by reference.

I. BACKGROUND

A. Technical Field

This invention pertains to the field of The present invention relates generally to computer numerical control ("CNC") machines and more particularly to methods and apparatus for entering instructions to CNC machines.

B. Description of Related Art

Numerical control (also computer numerical control, and commonly called CNC) is the automated control of machining tools (such as drills, lathes, mills and 3D printers) by means of a computer. A CNC machine processes a piece of material (metal, plastic, wood, ceramic, or composite) to meet specifications by following a coded programmed instruction and without a manual operator directly controlling the machining operation.

A CNC machine is a motorized maneuverable tool and often a motorized maneuverable platform, which are both controlled by a computer, according to specific input instructions. Instructions are delivered to a CNC machine in the form of a sequential program of machine control instructions such as G-code and M-code, then executed. The program can be written by a person or, far more often, generated by graphical computer-aided design (CAD) software and/or computer aided manufacturing (CAM) software.

CNC is a vast improvement over non-computerized machining that must be manually controlled (e.g. using devices such as hand wheels or levers) or mechanically controlled by prefabricated pattern guides (cams). In modern CNC systems, the design of a mechanical part and its manufacturing program is highly automated.

Since any particular component might require the use of a number of different tools—drills, saws, etc.—modern machines often combine multiple tools into a single "cell". In other installations, a number of different machines are used with an external controller and human or robotic operators that move the component from machine to machine. In either case, the series of steps needed to produce any part is highly automated and produces a part that closely matches the original CAD drawing or model.

A typical program may direct the CNC machine to load a specific-size drill, to position a work piece at a certain location, and then to use the capabilities of the CNC machine to drill a hole of a certain depth and bore into the work piece at specific specified locations. When the work is completed, the program will tell the CNC machine to stop working, and the part can be removed or otherwise further processed.

Typically, the program to perform the desired function is resident in the CNC machine controller must be loaded into it. Such choosing or programming has typically been performed by an operator who presses certain keystrokes on a keyboard or touchscreen. The operator interface for the CNC machine has been this keyboard or touchscreen arrangement where the operator of the machine interfaces with the controller through the keyboard and keystrokes.

Inherent in its process are certain challenges. One such challenge is operator error especially for inexperienced or untrained operators who may struggle understanding the various programs and information necessary for input into the controller.

A barcode or bar code or QR code is a method of representing data in a visual, machine-readable form. Initially, barcodes represented data by varying the widths and spacings of parallel lines. These barcodes, now commonly referred to as linear or one-dimensional (1D), can be scanned by special optical scanners, called barcode readers, of which there are several types. Later, two-dimensional (2D) variants were developed, using rectangles dots, hexagons and other patterns, called matrix codes or 2D barcodes, or QR codes although they do not use bars as such. 2D barcodes can be read using purpose-built 2D optical scanners, which exist in a few different forms. 2D barcodes can also be read by a digital camera connected to a microcomputer running software that takes a photographic image of the barcode and analyzes the image to deconstruct and decode the 2D barcode. A mobile device with an inbuilt camera, such as smartphone, can function as the latter type of 2D barcode reader using specialized application software.

Using barcodes, a highly skilled person, such as an engineer, can preprogram instructions for a machine or other electronic device. These instructions are then suitable for being transported to said machine or electronic device and used thereon by a person of lesser skill without the engineer or device operator having to worry about operator error in the program by the lesser skilled person. The same data preprogrammed on a barcode may be transmitted using RFID or ethernet networking, or any other method of networking.

What is needed in the art is a more accurate and more easily understood method and apparatus for entering commands and information into the CNC controller.

II. SUMMARY

Provided in this disclosure is a computer numerical control apparatus, including an operably connected first user interface configured to send operating instructions to the computer numerical control apparatus, and a second operably connected user interface comprising a barcode scanner configured to send operating instructions to the computer numerical control apparatus. A control board is functionally connected to the computer numerical control apparatus, the first user interface, and the second user interface. A selection component is provided for accepting operating instructions from at least one of the first user interface and the second user interface.

In one exemplary embodiment, the first user interface includes at least one of a keyboard or a touchscreen. The second user interface can include least one of a wired barcode scanner or a wireless barcode scanner. The second operably connected user interface can also include at least one of a remote control device, an Internet remote control, an RFID, a smart phone, or a computer.

A communication component can also be provided for communicating data representing the status of the apparatus to a remote user. The data includes at least one of sound data, image data, or text data. A remote input component can be provided for remotely inputting to the controller. A recording component can also be provided for recording actions of the apparatus.

A remote system can be provided for remote monitoring and control of the computer numerical control apparatus. The remote system is configured to emulate the first user interface and alternatively send operating instructions to the computer numerical control apparatus. The remote system can include a computer system having a first display to depict information displayed on the first user interface, and a second display and interactive component for emulating controls of the first user interface. The first display can be a computer monitor and the second display and interactive component comprise a laptop with keypad. A network router can be included for establishing a connection between the remote system and the computer numerical control apparatus. An audio-visual connection can be included for establishing 2-way communication between a remote programmer and a machine operator.

In another exemplary embodiment, a method of machining a work piece is disclosed, including the steps of providing a computer numerical control machine. The machine includes an operably connected first user interface configured to send operating instructions to the computer numerical control machine and a second operably connected user interface comprising a barcode scanner configured to send operating instructions to the computer numerical control machine. A control board is functionally connected to the computer numerical control machine, the first user interface, and the second user interface. A selection component is provided for accepting operating instructions from at least one of the first user interface and the second user interface. The steps of the method also include providing a work piece within the computer numerical control machine and inputting operating instructions to the computer numerical control machine using at least one of the first user interface or the second user interface. The selection component is used to choose operating instructions for the computer numerical control machine. The computer numerical control machine is used to machine said work piece using the selected operating instructions.

Other benefits and advantages of this invention will become apparent to those skilled in the art to which it pertains upon reading and understanding of the following detailed specification.

III. BRIEF DESCRIPTION OF THE DRAWINGS

The disclosed CNC machine may take physical form in certain parts and arrangement of parts, embodiments of which will be described in detail in this specification and illustrated in the accompanying drawings which form a part hereof and wherein.

Corresponding reference characters indicate corresponding parts throughout the several views. The exemplary embodiments set forth herein are not to be construed as limiting the scope of the invention in any manner.

IV. DETAILED DESCRIPTION

The present invention will be discussed hereinafter in detail in terms of various exemplary embodiments according to the present invention with reference to the accompanying drawings. In the following detailed description, numerous specific details are set forth in order to provide a thorough understanding of the present invention. It will be obvious, however, to those skilled in the art that the present invention may be practiced without these specific details. In other instances, well-known structures are not shown in detail in order to avoid unnecessary obscuring of the present invention.

Thus, all of the implementations described below are exemplary implementations provided to enable persons skilled in the art to make or use the embodiments of the disclosure and are not intended to limit the scope of the disclosure, which is defined by the claims. As used herein, the word "exemplary" or "illustrative" means "serving as an example, instance, or illustration." Any implementation described herein as "exemplary" or "illustrative" is not necessarily to be construed as preferred or advantageous over other implementations. Moreover, in the present description, the terms "upper", "lower", "left", "rear", "right", "front", "vertical", "horizontal", and derivatives thereof shall relate to the invention as oriented in FIG. 1.

Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 1:
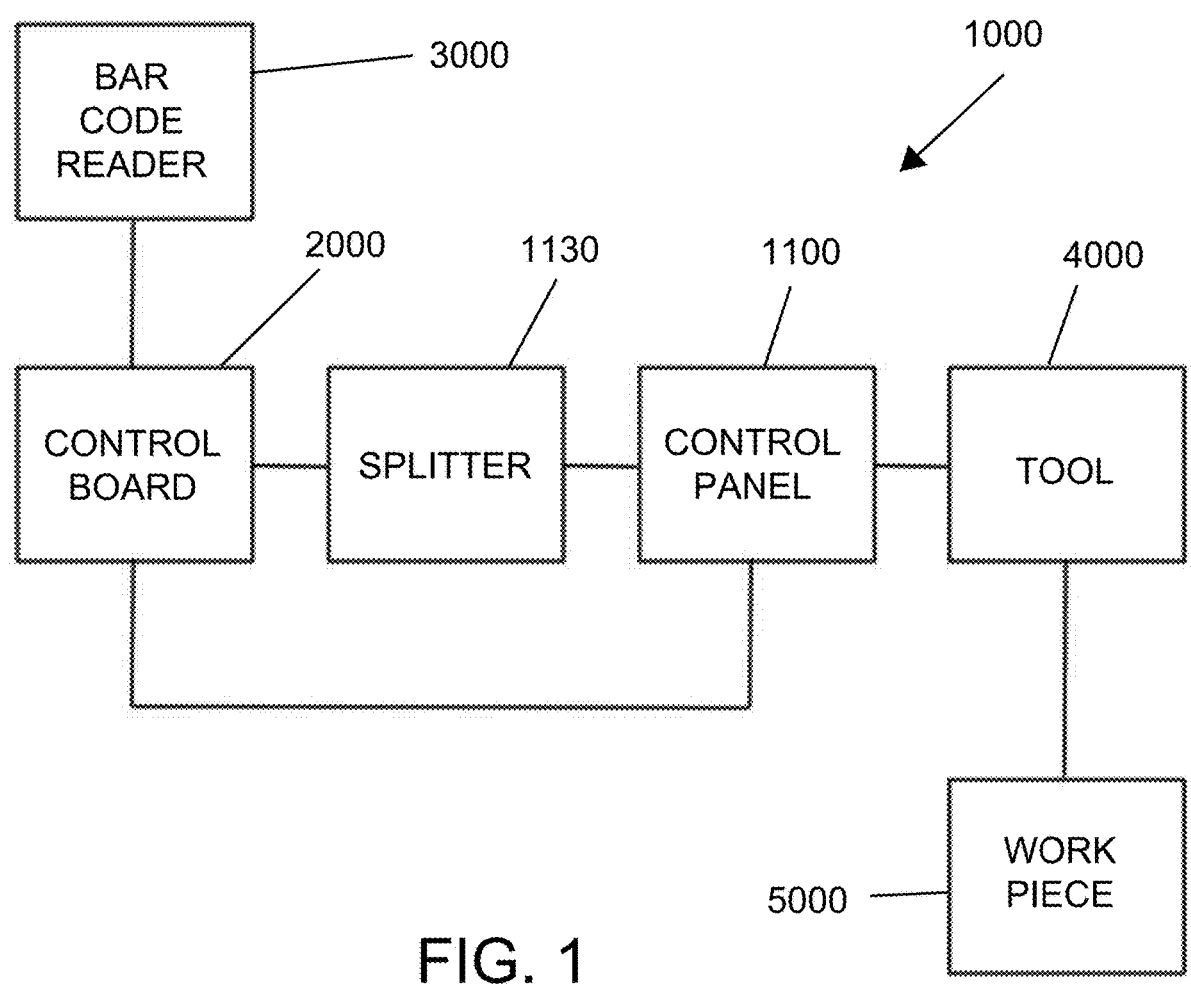
FIG. 1 shows a schematic diagram of an exemplary CNC machine in accordance with the present invention.

FIG. 1 shows a schematic diagram of an exemplary CNC machine 1000 in accordance with the present invention. The CNC machine 1000 comprises a control panel 1100 electronically connected to a control board 2000 for bilateral communication between the same. The control board 2000 is further electronically connected to a bar code reader 3000. In alternative embodiments, the control board 2000 is adapted to accept instructions from wired or wireless devices, including, a smart phone, RFID, a local computer, an Internet based signal, a keypad, or other device.

The control board 2000 is further connected electronically or wirelessly to the working tool 4000 such that the control panel 1100 can provide operating instructions through the control board 2000 to the tool 4000. A work piece 5000 is disposed within a functional area of the tool 4000 so that the tool 4000 may perform processing operations on the work piece 5000. These processing operations include well known machining operations such as milling, drilling, and cutting.

Figure 2:
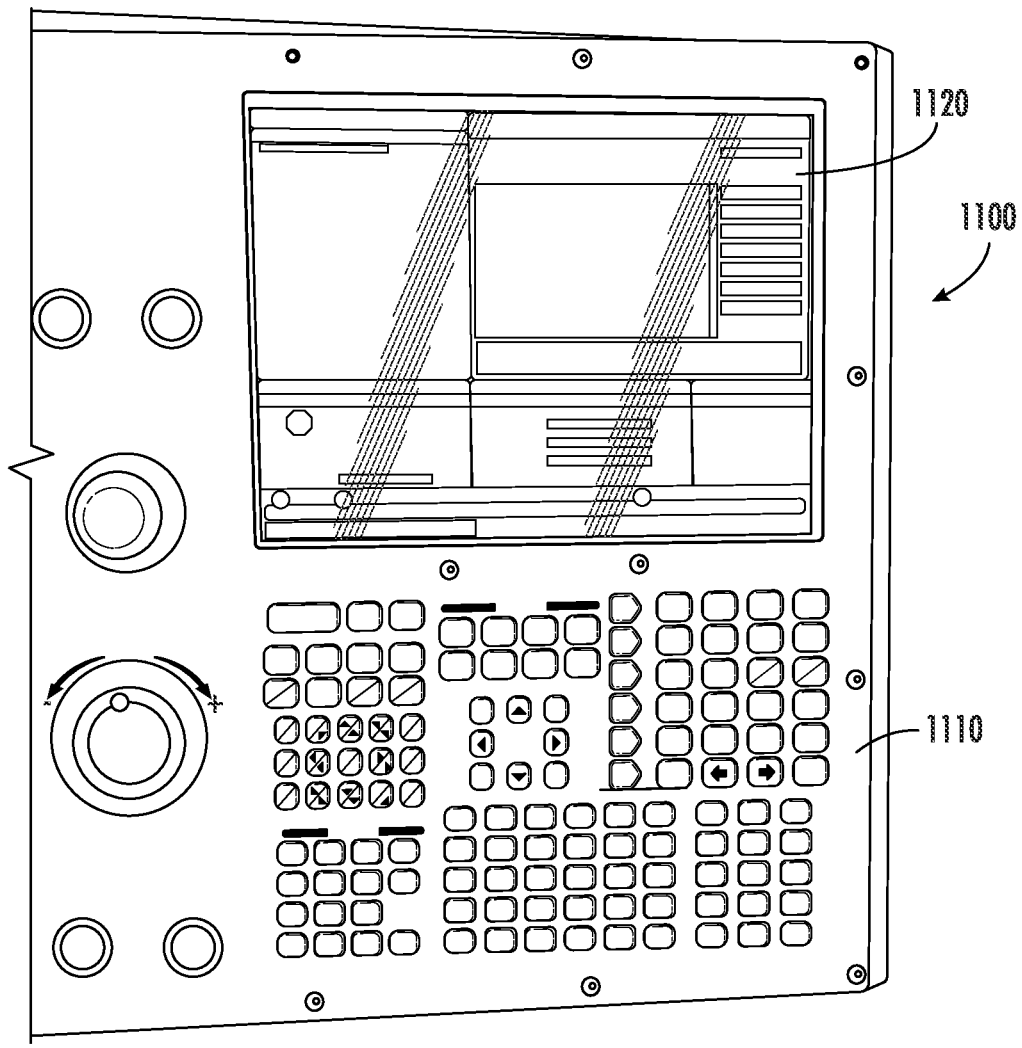
FIG. 2 shows an exemplary control panel for a CNC machine in accordance with the present invention.
Figure 3:
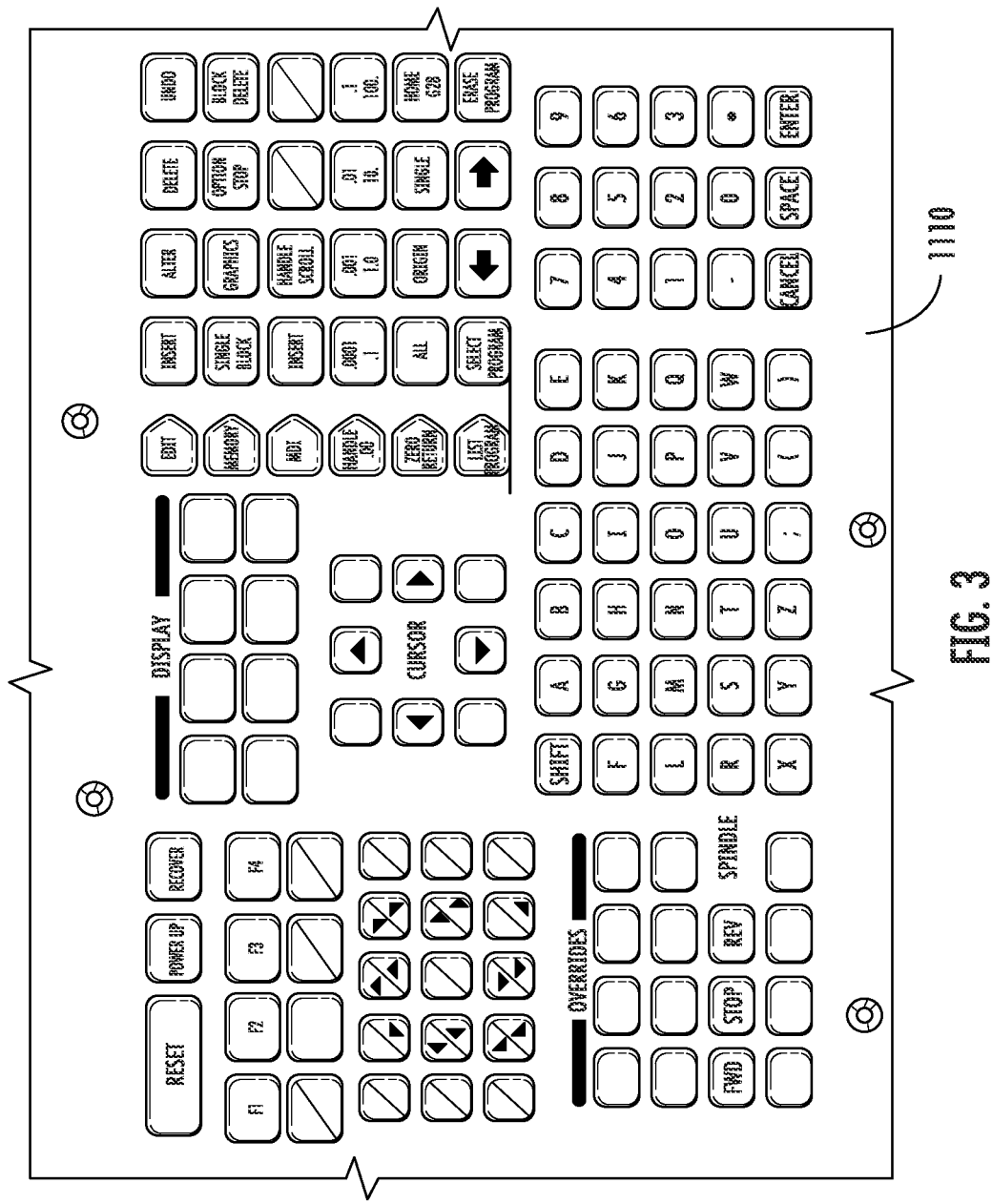
FIG. 3 shows a close of up the keypad of the control panel of FIG. 2.

FIG. 2 shows an exemplary user interface such as the control panel 1100. The control panel 1100 further comprises a keypad 1110 and an interactive screen 1120. FIG. 3 shows a close of up the keypad 1110 of the control panel 1110.

Figure 4:
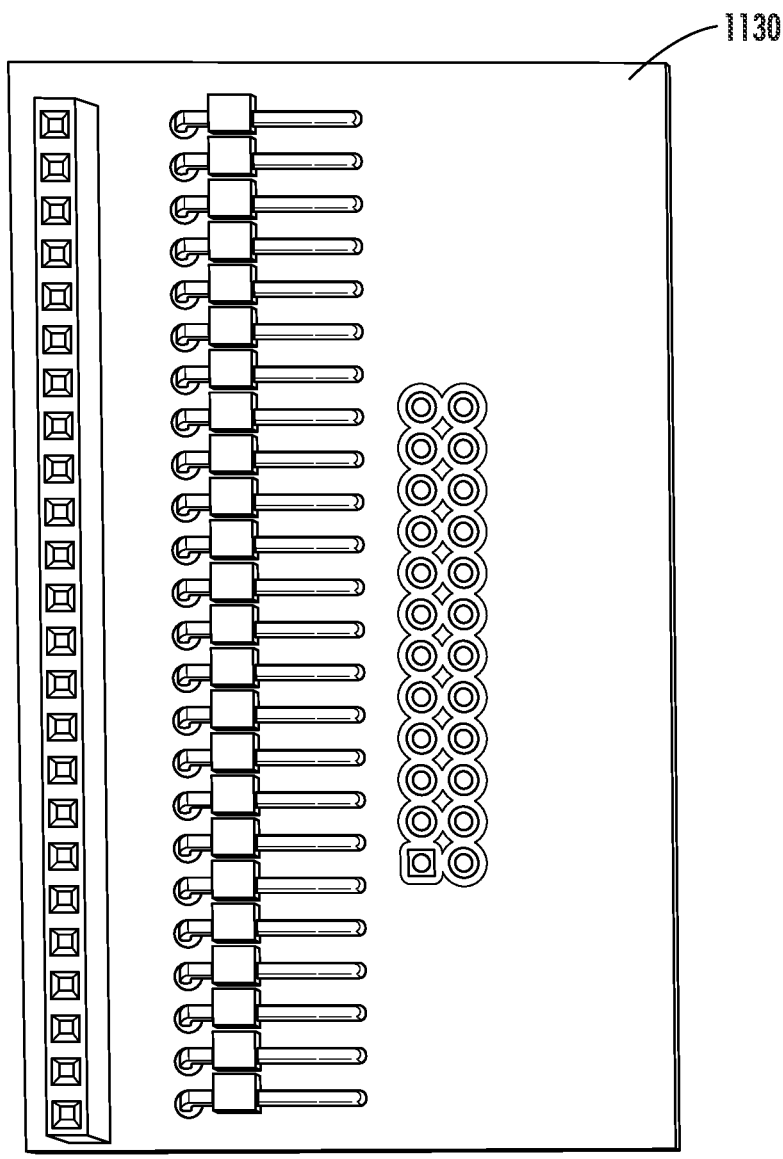
FIG. 4 shows a splitter for the control panel of FIGS. 2 and 3.
Figure 5:
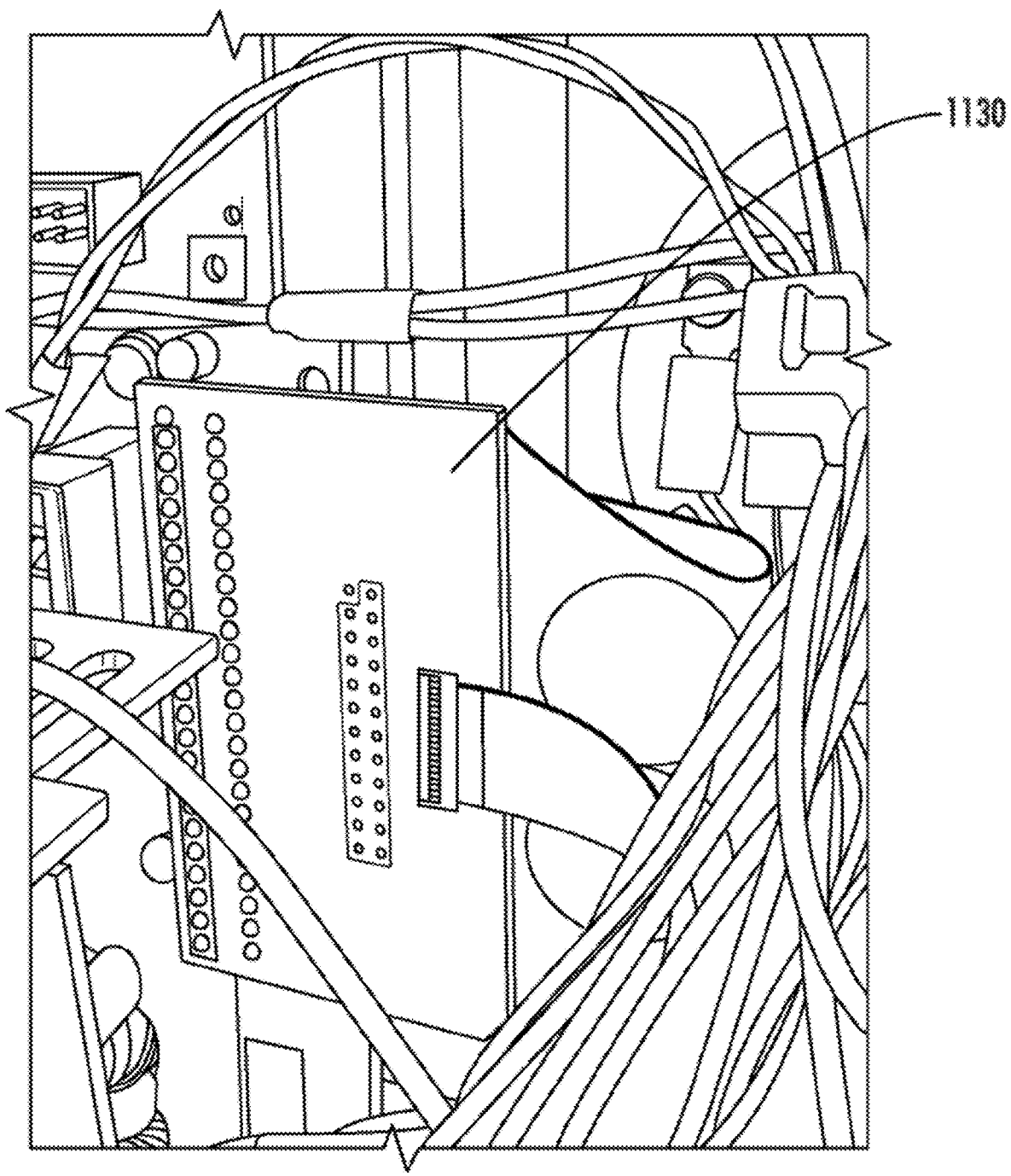
FIG. 5 shows the back of the control panel of FIGS. 2 and 3 with the splitter of FIG. 4 installed.

FIG. 4 shows a splitter 1130 for use with the control panel 1100. As illustrated in FIG. 5, the splitter 1130 is preferably operably attached to the central processing apparatus of the CNC machine 1000.

Figure 6:
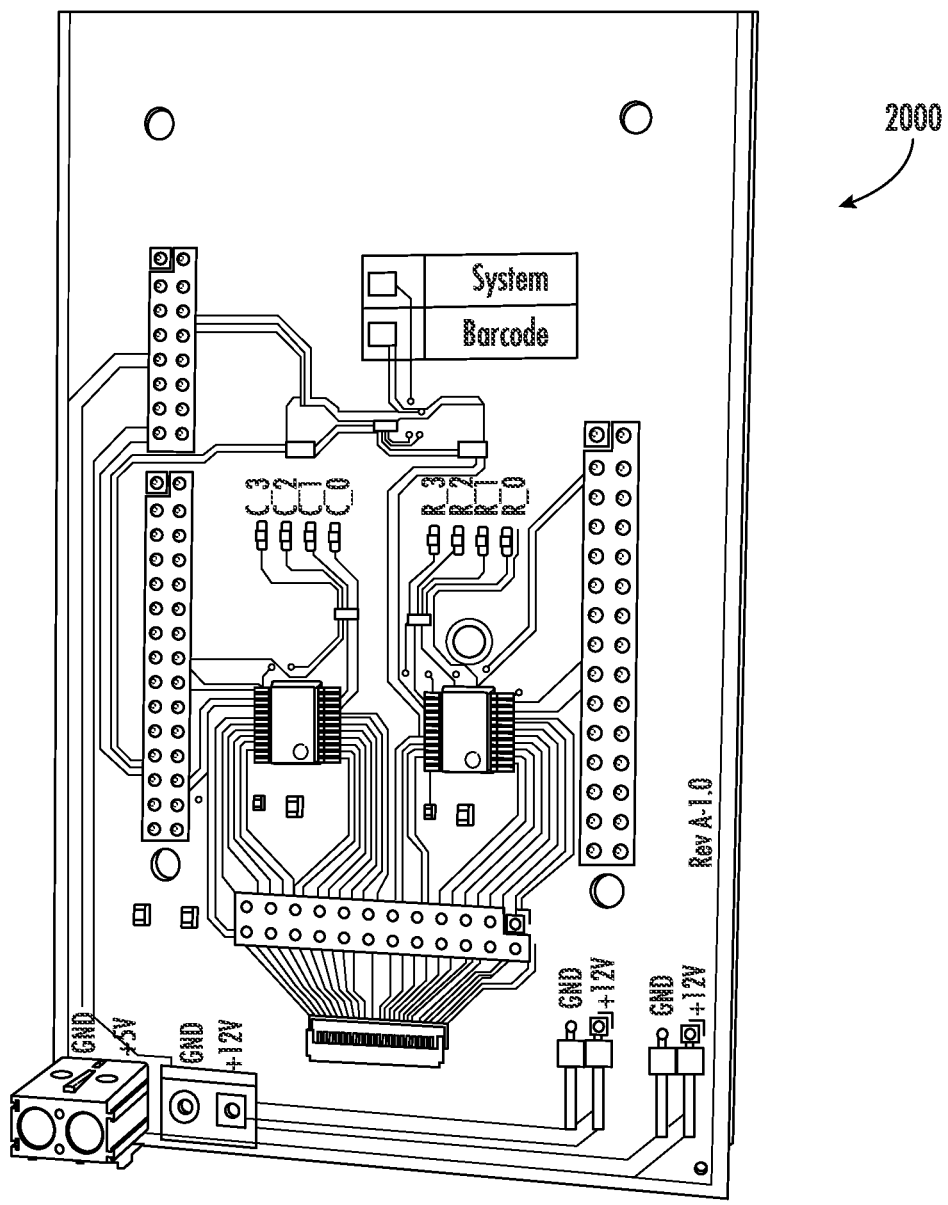
FIG. 6 shows an exemplary control board in accordance with the present invention.
Figure 7:
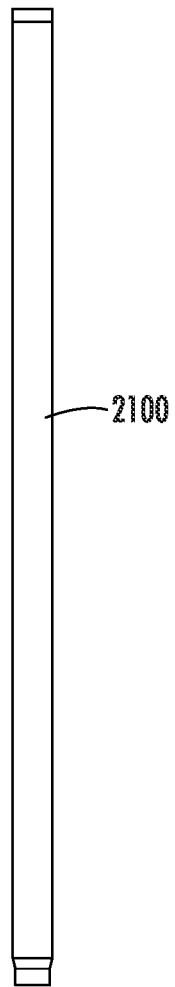
FIG. 7 shows an exemplary ribbon for connecting the control board of FIG. 6 with the splitter of FIG. 4.
Figure 8:
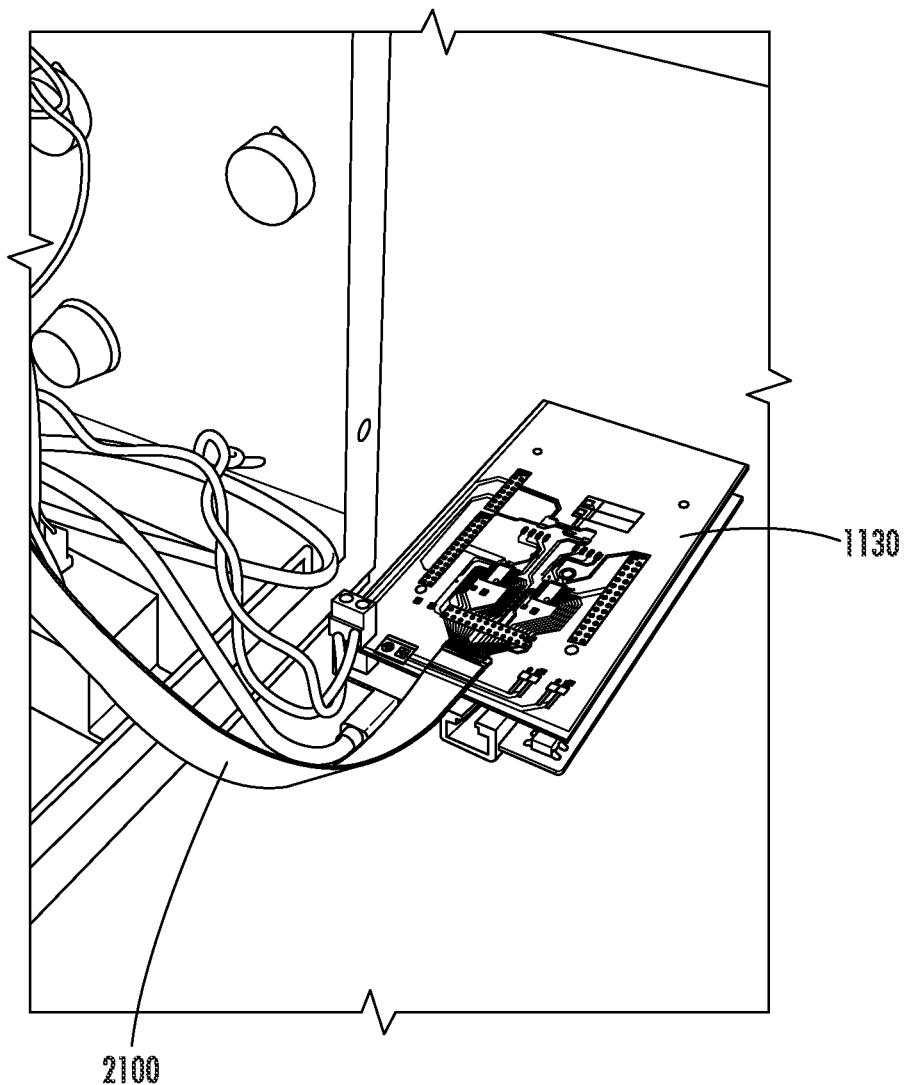
FIG. 8 shows the control board of FIG. 6 attached to the splitter of FIG. 4.

FIG. 6 shows an exemplary control board 2000 in accordance with the present invention. The control board 2000 is functionally attached (FIG. 8) to the splitter 1130 via known means such as a ribbon 2100 (FIG. 7). The control board 2000 is functionally attached to the control panel 1100 and to a second user input device, specifically, the barcode reader 3000, as schematically illustrated in FIG. 1. The barcode reader 3000 and the control panel 1000 are both adapted to be able to supply a signal including operating instructions to the control board 2000. The control board 2000 further also includes components to selectively utilize a signal (programming/operating instructions) from one user interface selected from a group including the control panel 1100 and the barcode reader 3000. The aforementioned components can include a selection component such as a manual switch or button located on the control board 2000 or the control panel 1100. Alternatively, said the selection component can be software based and included in a program initiated by an exemplary barcode reader (FIG. 9) reading a preprogramed exemplary barcode 3100 (FIG. 10) or by a user employing the keypad 1110.

Figure 11:
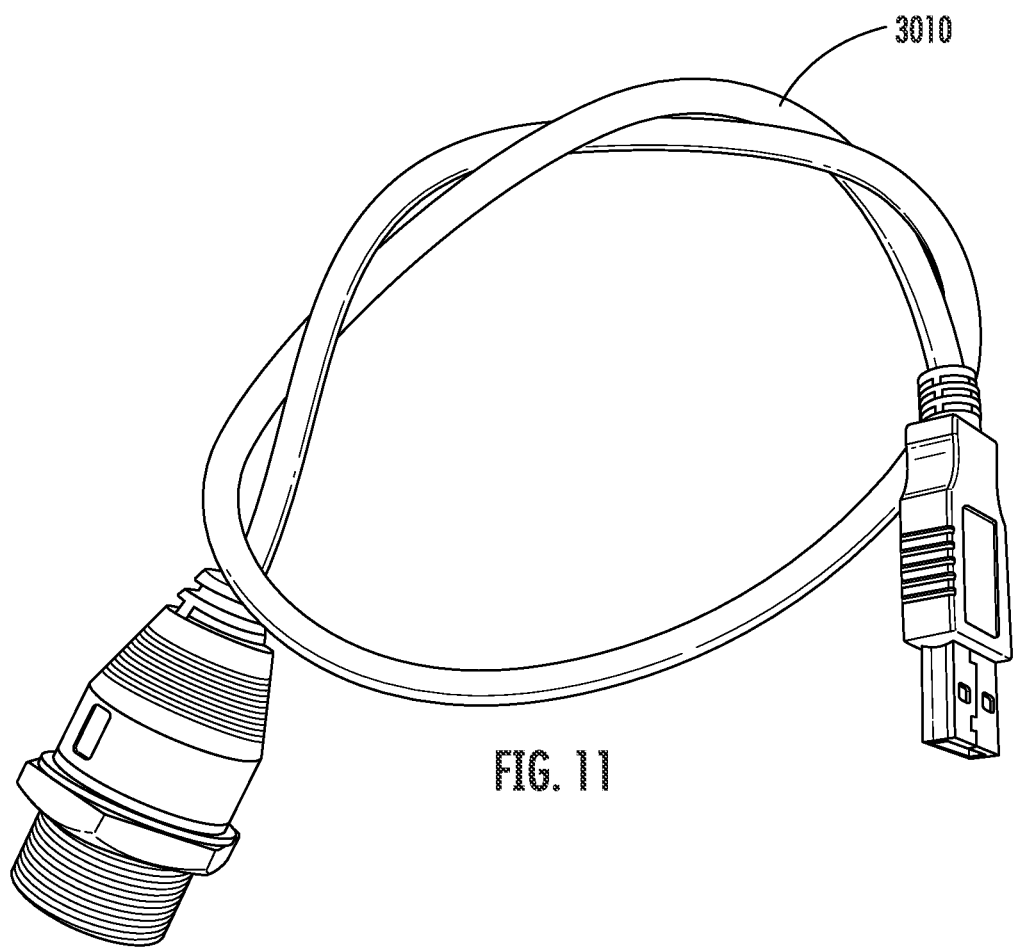
FIG. 11 shows an exemplary barcode reader connection cord for use with the present invention.

FIG. 11 shows an exemplary barcode reader connection cord 3010 for use with the present invention. The control board 2000 enables the operator to input the necessary data to the controller either in the conventional way (using the control panel 1100 and the keyboard 1110) or by using the inventive barcode-reading way or remote control/wireless internet/RFID. In other words, when the invention is installed in a controller, the operator can input data either the conventional way (using the keyboard 1110) or by scanning the appropriate barcode 3100.

Figure 9:
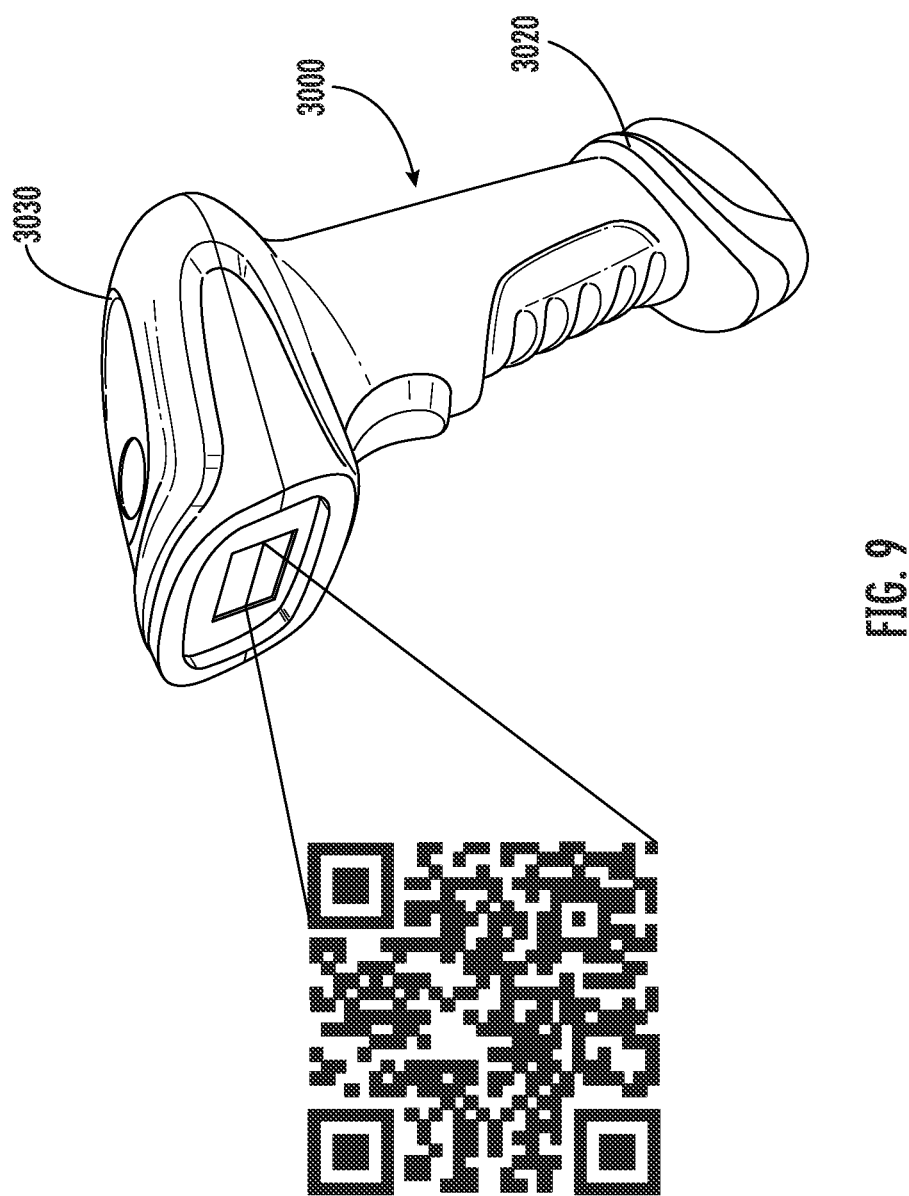
FIG. 9 shows an exemplary barcode reader for use with the present invention.
Figure 10:
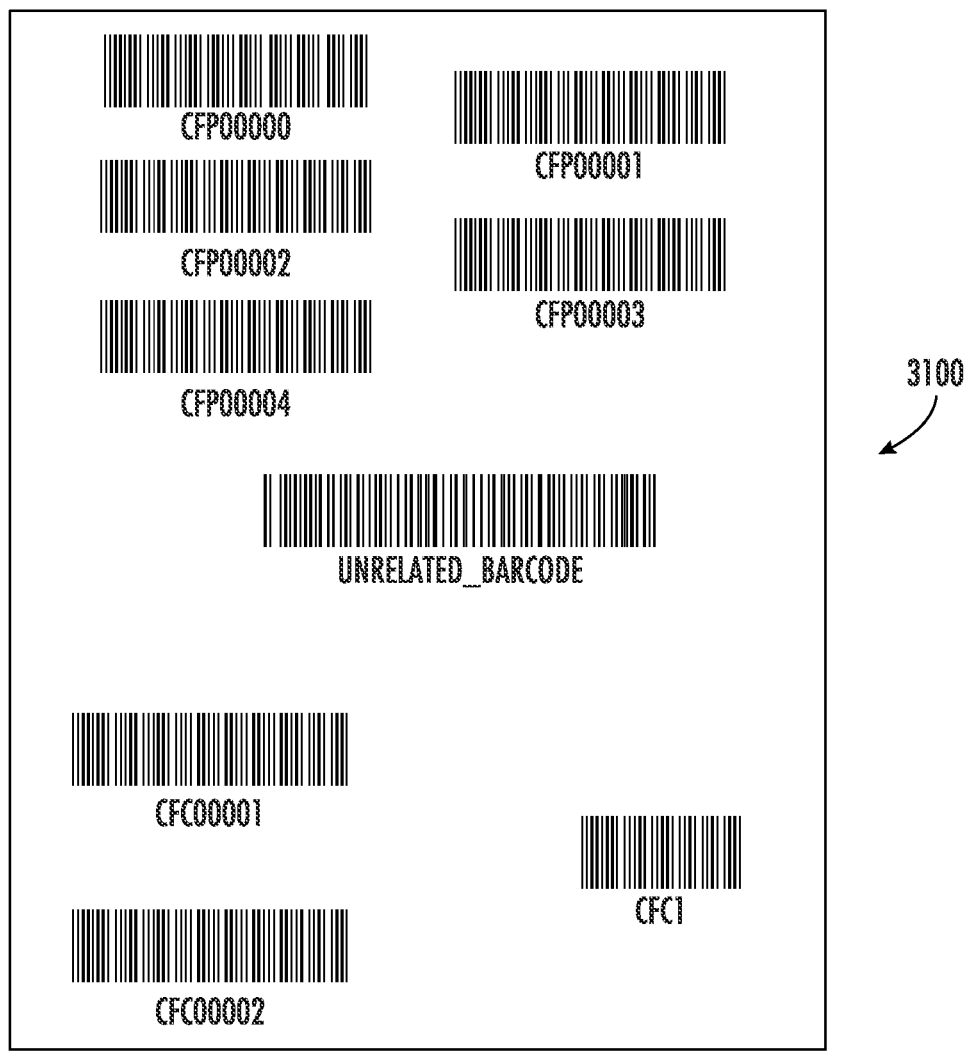
FIG. 10 shows an exemplary barcode for use with the present invention.

As shown in FIG. 9, the barcode reader 3000 is preferably configured in the shape of a gun to facilitate easy handling by a user. A handle 3020 is configured to easily fit into the hand and fingers of the user while a light source within a reader head 3030 projects a light which reflects off of an associated barcode. The associated barcode 3100 is then accurately and easily and quickly read by the barcode reader 3000. Commands entered by the operator through the barcode reader 3000 pass through the control board 2000 and into the board. The accuracy and ease of use of barcode reading is well known. However, heretofore, such capability has not been applied to the CNC machining realm.

The control board 2000 enables the operator to input the necessary data to the controller either in the conventional way (using the user interface and the keyboard 1110) or by using the inventive barcode-reading way. In other words, when the invention is installed in a controller, the operator can input data either the conventional way (using the keyboard 1110) or by scanning the appropriate barcode.

In the preferred embodiment, the first command in every barcode, designated by "C", is a "clear" command which empties and clears previous commands from the controller's memory. In this way, the new command can be correctly loaded into the controller without being confused with previous commands or unfinished steps of the previous command. The next letter, "F", instructs the controller to find a preloaded program. The next alphanumeric string in the command can refer to job number, part numbers, etc. Essentially, any data or information previously entered into the user interface by depressing keys can now be entered more accurately and easily by creating the appropriate barcode 3100 and instructing the operator to read the barcode 3100 into the controller by operation of the associated barcode reader. Upon scanning of the barcode 3100, the control board 2000 retrieves one of the preloaded programs which the tool 4000 then implements in the CNC operation. Scanning a new barcode 3100 clears out that existing program and then implements the new preloaded program associated with that new barcode 3100.

Figure 12:
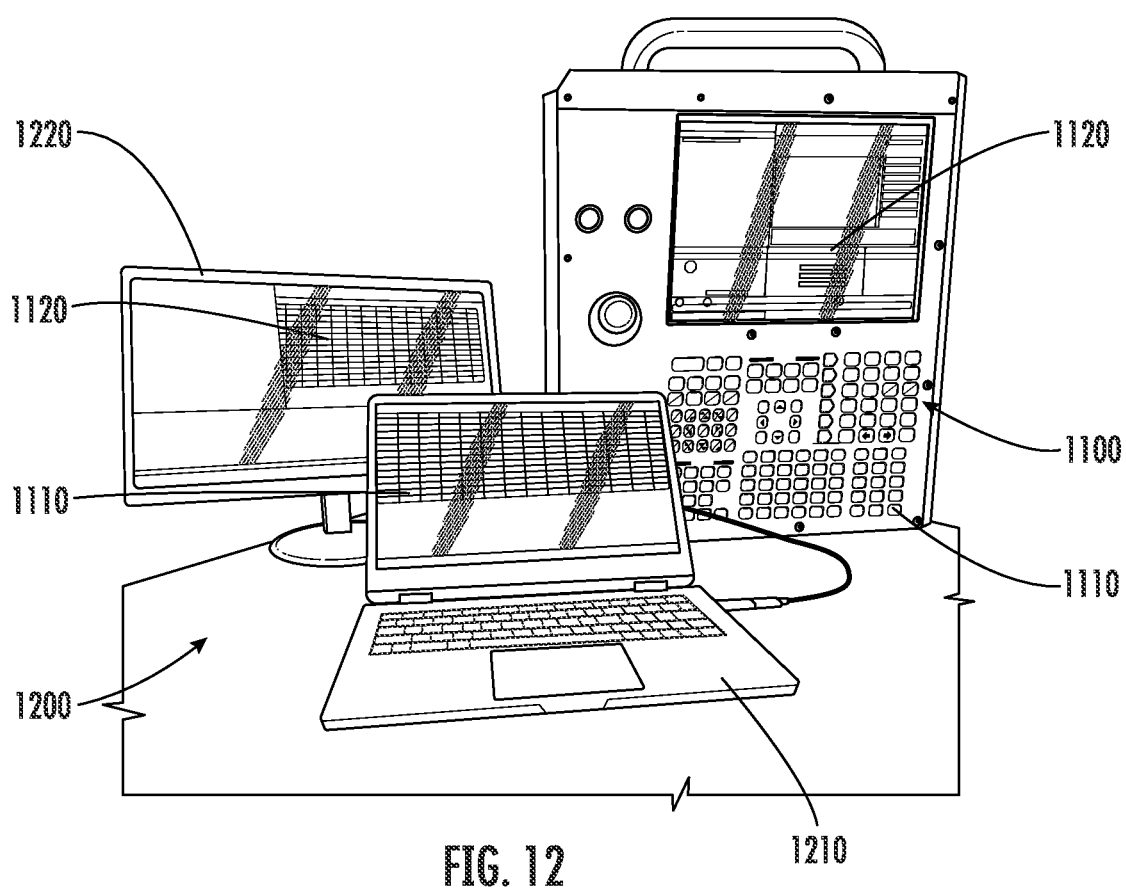
FIG. 12 shows exemplary components that can be utilized with a remote connection for use with the present invention.
Figure 13:
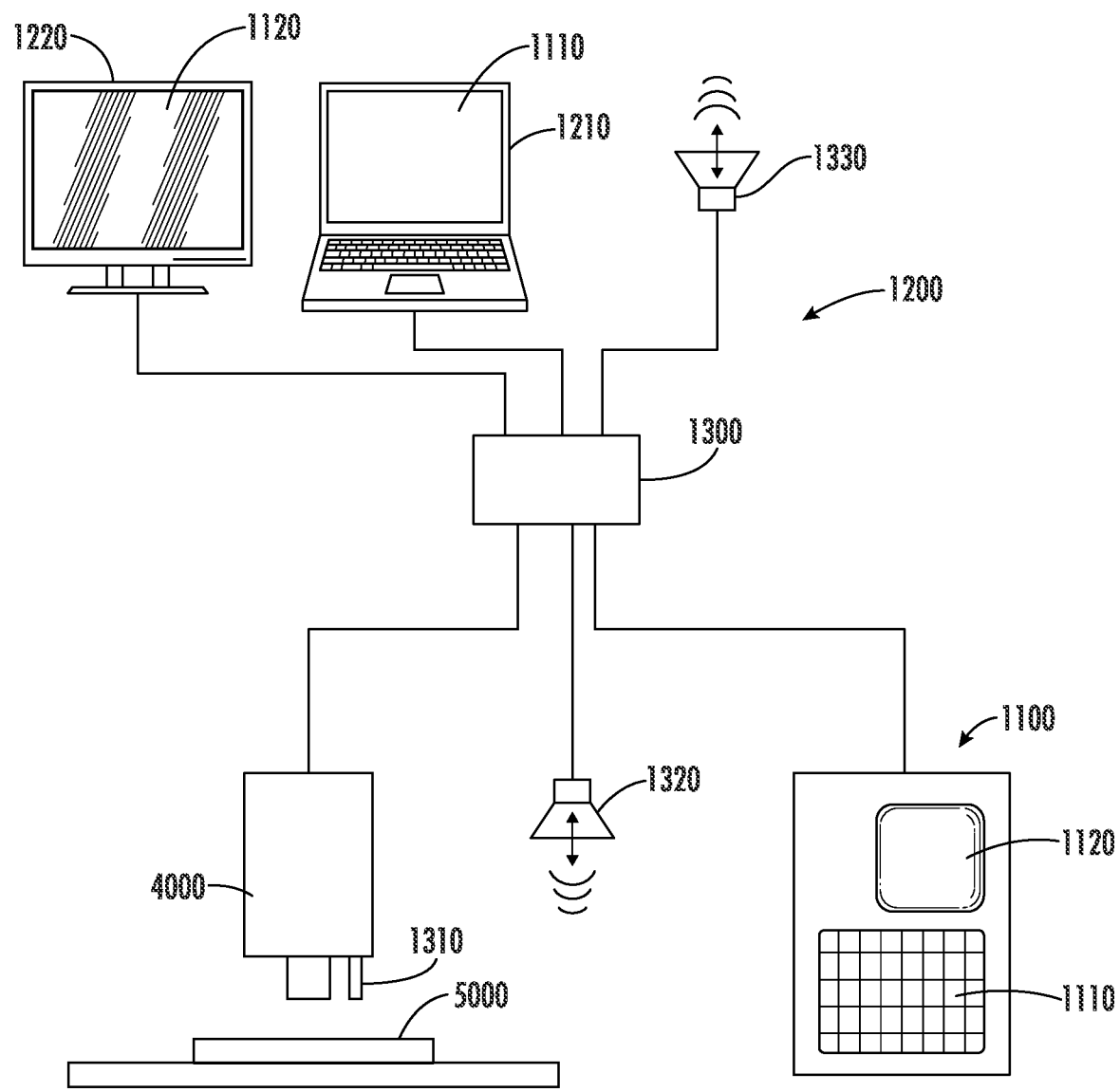
FIG. 13 is a schematic of a CNC system including the exemplary components shown in FIG. 12 that can be utilized with a remote connection for use with the present invention.

The present invention is also readily extendible to remote monitoring and operation from any location. As shown in FIGS. 12 and 13, the present invention, an exemplary remote system 1200 can include a laptop 1210 and a separate monitor 1220. However, it is to be appreciated that a remote system 1200 can alternatively include two laptops 1210 having respective screens, or a desktop computing system having dual monitors 1220, or any other suitable configuration of components.

As shown in FIGS. 12 and 13, the exemplary remote system 1200 preferably includes the monitor 1220 which remotely displays the identical information and content as that displayed on the interactive screen 1120 of the control panel 1100. The screen of the laptop 1210 preferably displays user-operable controls which emulate the keypad 1110 of the control panel 1100. In this manner, a user at a remote location can access and control the operation of the tool 4000 from any remote location via the internet or other suitable network, with the information being updated in real time.

With specific reference to FIG. 13, the remote system 1200 is remotely connected to the control panel 1100 via a network router 1300, which can be a wireless router for a local connection or can be an internet router that can connect to the CNC system and control the tool 4000 from any location in the world. The remote system 1200 can include an audio-visual connection for establishing 2-way communication between a remote programmer and a machine operator. The audio-visual connection can include a camera 1310 positioned along the spindle of the tool 4000 to inspect the workpiece 5000 during operation. A microphone/speaker unit 1330 can be located within earshot of the machine operator near the tool 4000 while another microphone/speaker unit 1330 is positioned in proximity to the remote programmer. In this manner, the remote programmer can communicate with the operator on site to troubleshoot the tool 4000 or make adjustments, such as fixing incorrect offsets, for example. In another alternate embodiment, the on-site operation can be eliminated altogether and the present system can enable the entire operation to be run by a remote operator in a "lights-out manufacturing" process.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

Numerous embodiments have been described herein. It will be apparent to those skilled in the art that the above methods and apparatuses may incorporate changes and modifications without departing from the general scope of this invention. It is intended to include all such modifications and alterations in so far as they come within the scope of the appended claims or the equivalents thereof.

Having thus described the invention, it is now claimed:

1. A computer numerical control apparatus, comprising:
   an operably connected first user interface configured to send operating instructions to the computer numerical control apparatus;
   an operably connected second user interface comprising a barcode scanner configured to send, to the computer numerical control apparatus, operating instructions that are encoded in a barcode and that include a clear command to clear one or more previous commands from a memory of the computer numerical control apparatus, and a find command to find a preloaded program identified by a string associated with the find command, in which the preloaded program defines one or more operations to be performed by the computer numerical control apparatus on a work piece disposed within a functional area of the computer numerical control apparatus;
   a control board functionally connected to the computer numerical control apparatus, the first user interface, and the second user interface; and
   a selection component for accepting operating instructions from at least one of the first user interface and the second user interface, wherein the selection component includes a program that is configured to be initiated to accept, in response to the barcode scanner reading the barcode, the operating instructions from the barcode scanner of the second user interface, and to accept, in response to a user utilizing the first user interface, the operating instructions from the first user interface.

2. The computer numerical control apparatus of claim 1, wherein the first user interface comprises at least one of a keyboard or a touchscreen.

3. The computer numerical control apparatus of claim 1, wherein the second user interface comprises at least one of a wired barcode scanner or a wireless barcode scanner.

4. The computer numerical control apparatus of claim 1, wherein the second operably connected user interface further comprises at least one of a remote control device, an Internet remote control, an RFID, a smart phone, or a computer.

5. The computer numerical control apparatus of claim 1, connected to a router for communicating data representing the status of the computer numerical control apparatus to a remote user, wherein the data comprises at least one of sound data, image data, or text data.

6. The computer numerical control apparatus of claim 1, the computer numerical control apparatus communicatively connected to a remote system for remotely inputting to the computer numerical control apparatus.

7. The computer numerical control apparatus of claim 6, the computer numerical control apparatus further comprising a camera positioned along a spindle to enable remote inspection of a workpiece operated on by the computer numerical control apparatus.

8. The computer numerical control apparatus of claim 1, wherein the computer numerical control apparatus is communicatively connected to a remote system for providing remote monitoring and control of the computer numerical control apparatus, wherein the remote system is configured to emulate the first user interface and alternatively send operating instructions to the computer numerical control apparatus.

9. The computer numerical control apparatus of claim 8, wherein the remote system comprises a computer system having a first display to depict information displayed on the first user interface, and a second display and interactive component for emulating controls of the first user interface.

10. The computer numerical control apparatus of claim 9, wherein the first display comprises a computer monitor and the second display and interactive component comprise a laptop with keypad.

11. The computer numerical control apparatus of claim 8, wherein the computer numerical control apparatus is communicatively connected to the remote system by a network router.

12. The computer numerical control apparatus of claim 8, wherein the computer numerical control apparatus is communicatively connected via an audio-visual connection for establishing 2-way communication between a remote programmer and a machine operator.

13. A method of machining a work piece, comprising steps of:
   providing a computer numerical control machine, comprising:
   an operably connected first user interface configured to send operating instructions to the computer numerical control machine;
   an operably connected second user interface comprising a barcode scanner configured to send, to the computer numerical control machine, operating instructions that are encoded in a barcode and that include a clear command to clear one or more previous commands from a memory of the computer numerical control machine, and a find command to find a preloaded program identified by a string associated with the find command, in which the preloaded program defines one or more operations to be performed by the computer numerical control machine on a work piece disposed within a functional area of the computer numerical control machine;
   a control board functionally connected to the computer numerical control machine, the first user interface, and the second user interface; and
   a selection component for accepting operating instructions from at least one of the first user interface and the second user interface, wherein the selection component includes a program that is configured to be initiated to accept, in response to the barcode scanner reading the barcode, the operating instructions from the barcode scanner of the second user interface, and to accept, in response to a user utilizing the first user interface, the operating instructions from the first user interface;
   wherein the steps further comprise:
   providing the work piece within the computer numerical control machine;
   inputting operating instructions to the computer numerical control machine using at least one of the first user interface or the second user interface;
   using the selection component to choose operating instructions for the computer numerical control machine; and
   using the computer numerical control machine to machine said work piece using the selected operating instructions.

* * * * *